(12) United States Patent
Sohn et al.

(10) Patent No.: US 7,428,194 B2
(45) Date of Patent: Sep. 23, 2008

(54) INTEGRATED OPTICAL PICKUP AND OPTICAL RECORDING AND/OR REPRODUCING APPARATUS USING THE SAME

(75) Inventors: Jin-seung Sohn, Seoul (KR);
Myung-bok Lee, Suwon-si (KR);
Mee-suk Jung, Suwon-si (KR);
Eun-hyoung Cho, Seoul (KR);
Hae-sung Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 633 days.

(21) Appl. No.: 10/986,838

(22) Filed: Nov. 15, 2004

(65) Prior Publication Data

US 2005/0105406 A1    May 19, 2005

(30) Foreign Application Priority Data

Nov. 13, 2003    (KR) ..................... 10-2003-0080094

(51) Int. Cl.
*G11B 7/00* (2006.01)
(52) U.S. Cl. .............................. 369/44.23; 369/112.23; 369/44.12
(58) Field of Classification Search ............... 369/44.11, 369/44.12, 44.14, 44.15, 112.27, 44, 24, 369/112.1, 112.01, 112.23, 44.23
See application file for complete search history.

(56) References Cited

U.S. PATENT DOCUMENTS 5,745,304 A * 4/1998 Choi ........................ 359/719
5,761,178 A * 6/1998 Fukakusa et al. ....... 369/112.27
6,081,496 A * 6/2000 Otsubo et al. .......... 369/112.26
6,717,893 B1 * 4/2004 Niss et al. ................ 369/44.19

FOREIGN PATENT DOCUMENTS

| JP | 04-162222 A | 6/1992 |
|---|---|---|
| JP | 07-021581 A | 1/1995 |
| JP | 07-050032 A | 2/1995 |
| JP | 7-114743 A | 5/1995 |
| JP | 07-201065 A | 8/1995 |
| JP | 11-185285 A | 7/1999 |
| JP | 2001-273670 A | 10/2001 |
| JP | 2002-341116 A | 11/2002 |
| JP | 2002-367216 A | 12/2002 |
| KR | 0141757 B1 | 7/1998 |

* cited by examiner

*Primary Examiner*—Nabil Z Hindi
(74) *Attorney, Agent, or Firm*—Sughrue Mion, PLLC

(57) ABSTRACT

An optical pickup and an optical recording and/or reproducing apparatus using the optical pickup are provided. The optical pickup includes: a light source; an optical bench on which the light source is mounted; a focusing member including an objective lens, focusing light emitted from the light source to form a light spot on an optical information storage medium; and an optical path forming member having a transparent block that includes a light entrance/exit surface on which the optical bench and the focusing member are arranged, a first reflection surface, and a second reflection surface opposing the first reflection surface, where the optical path forming member directs the light emitted from the light source toward the objective lens by reflecting the light emitted from the light source on the first and second reflection surfaces. The optical pickup satisfies the requirement for smaller, slimmer design and can be integrated using semiconductor manufacturing processes.

25 Claims, 18 Drawing Sheets

INTEGRATED OPTICAL PICKUP AND OPTICAL RECORDING AND/OR REPRODUCING APPARATUS USING THE SAME

BACKGROUND OF THE INVENTION

This application is based upon and claims the benefit of priority from Korean Patent Application No. 2003-80094, filed on Nov. 13, 2003, in the Korean Intellectual Property Office, the disclosure of which is incorporated herein in its entirety by reference.

1. Field of the Invention

The invention relates to an optical recording and/or reproducing apparatus, and more particularly, to an ultra small, integrated optical pickup and an optical recording and/or reproducing apparatus using the same.

2. Description of the Related Art

In an optical recording (and/or reproducing apparatus) that records arbitrary information on an optical information storage medium (and/or reproduces information recorded on the optical information storage medium) by focusing laser light using an objective lens, the recording capacity is determined according to the size of a focused light spot. The size (S) of a focused light spot is determined according to the wavelength ($\lambda$) of laser light and the numerical aperture (NA) of an objective lens, as expressed by formula (1) below.

$$S \propto \lambda/NA \qquad (1)$$

Therefore, to reduce the size of a light spot focused on an optical information storage medium, and thereby provide a higher recording density, research into an optical recording and/or reproducing apparatus using a short wavelength light source such as a blue laser and an objective lens having an NA of 0.6 or greater has been conducted.

Since the development of compact discs (CDs), which require light of a wavelength of 780 nm and an objective lens having an NA of 0.45 or 0.5 to record information thereon and/or reproduce information therefrom, intensive research has been conducted to raise the recording density and information storage capacity of the media. Digital versatile discs (DVDs), upon which information can be recorded on and reproduced from using light having a wavelength of 650 nm and an objective lens having an NA or 0.6 or 0.65, were obtained as a product of the research.

In current years, there has been steady progress in research into high-density information storage media using blue light having a wavelength of, for example, 405 nm, and a recording capacity of 20 GB or greater.

There have been efforts to standardize such high-density optical information storage media, and a few standards have almost been set up. For example, when light having a blue wavelength of 405 nm is used in a high-density optical information storage medium, an objective lens for this high-density optical information storage medium has an NA of 0.65 or 0.85, which will be described later.

A further difference between CDs and DVDs is that, while the thickness of a DVD is 0.6 mm, the thickness of a CD is 1.2 mm. This is because the tolerance to a tilt of the optical information storage medium should be ensured since a NA of an objective lens is increased to 0.6 for the DVD from 0.45 for the CD.

In a high-density optical information storage medium having a higher storage capacity than DVDs, when the NA of an objective lens therefore is increased to, for example, 0.85, the thickness of the high-density optical information storage medium has to be reduced to about 0.1 mm.

Such a high-density optical information storage medium that has a reduced thickness and requires a greater NA objective lens is referred to as a "blue-ray disc (BD)". According to the standards for BDs, the wavelength of a light source is 405 nm, and the NA of an objective lens is 0.85. A standard thickness of the optical information storage medium for BDs is about 0.1 mm.

In addition to BDs, advanced optical discs (AODs) are currently under development as high-density optical information storage media. AODs have the same substrate thickness and require an objective lens having the same NA as for DVDs. However, the wavelength of a standard light source, a blue wavelength of, for example, 405 nm, matches the standard for BDs.

In addition to the requirement for reducing the size of a light spot with an objective lens having a greater NA for high-density, high-capacity optical information storage media, there is a need for a slimmer, smaller optical system constituting an optical pickup.

Along with the increasing need for using optical recording and/or reproducing apparatuses in portable terminals, such as personal digital assistants (PDAs), mobile phones, digital cameras, portable disc players, camcoders, etc., recently, there has been an increasing need for slim optical pickups. For applications in the field of portable terminals, optical pickups should be slim and small and be able to record and/or reproduce a large amount of information, such as music, moving pictures, etc., at a high density.

However, there are technical limitations in manufacturing a small, slim optical system by reducing the sizes of optical elements constituting a conventional optical pickup, such as those currently used in optical recording and/reproducing apparatuses for CDs and/or DVDs.

Furthermore, the conventional optical pickup is constructed by optically aligning and binding a plurality of individually manufactured optical elements. Therefore, due to an assembling error in the assembling and aligning of parts, the reliability of the assembled optical pick up, and the degree of automation, are lowered.

SUMMARY OF THE INVENTION

The invention provides an integrated, ultra-small optical pickup that satisfies the requirement for smaller, slimmer design and can be manufactured by semiconductor manufacturing processes, and an optical recording and/or reproducing apparatus using the integrated optical pickup.

According to an aspect of the invention, there is provided an optical pickup comprising: a light source; an optical bench on which the light source is mounted; a focusing member, comprising an objective lens, focusing light emitted from the light source to form a light spot on an optical information storage medium; and an optical path forming member comprising a transparent block comprising: a light entrance/exit surface on which the optical bench and the focusing member are arranged; a first reflection surface; and a second reflection surface opposing the first reflection surface, wherein the optical path forming member directs the light emitted from the light source toward the objective lens by reflecting the light emitted from the light source on the first and second reflection surfaces.

According to specific embodiments of the invention, at least one of the first and second reflection surfaces is inclined with respect to the light entrance/exit surface. At least one of the first and second reflection surfaces comprises a reflective coating arranged externally on the optical path forming member. Alternatively, at least one of the first and second reflection surfaces totally internally reflects the light emitted from the light source.

The optical pickup may further comprise a beam shaping element shaping the light emitted from the light source. The beam shaping element may comprise: a first lens element disposed on either a region of the optical path forming member on which the light emitted from the light source is incident, or the first reflection surface; and a second lens element disposed on either a region of the optical path forming member through which the light emitted from the light source exits, or the second reflection surface. In this case, the optical pickup may further comprise a third lens element that corrects distortion of light emitted from the light source after reflection by the optical information storage medium, and which has passed through the second lens element. The first or second lens elements may be one of a refraction cylindrical lens, a diffraction lens functioning as a cylindrical lens, a cylindrical reflection mirror, and a reflection and diffraction lens functioning as a cylindrical reflection mirror.

Alternatively, the beam shaping element may comprise: a fourth lens element disposed on either a region of the optical path forming member on which the light emitted from the light source is incident, or the first reflection mirror surface; and a polarization diffraction lens disposed on a region of the optical path forming member through which the light emitted from the light source exits. The polarization diffraction lens may function as a cylindrical lens with respect to the light emitted from the light source as it proceeds toward the focusing member. The lens element may be one of a refraction cylindrical lens, a diffraction lens functioning as a cylindrical lens, a cylindrical reflection mirror, and a reflection and diffraction lens functioning as a cylindrical reflection mirror.

The optical bench may comprise: a mount on which the light source is arranged; and a slanting mirror surface that directs the light emitted from the light source toward the optical path forming member.

The optical pickup may further comprise: a third reflection mirror formed on the optical path forming member that reflects a portion of the light emitted from the light source and incident on the optical path forming member; and a monitoring photodetector, arranged on the optical bench, that receives the portion of the light emitted from the light source and reflected by the third reflection mirror, to monitor an intensity of the light emitted from the light source.

The optical pickup may further comprise: a main photodetector that receives light emitted from the light source and reflected by the optical information storage medium to detect a reproducing signal and/or an error signal; and an optical path separating member that separates a first optical path of the light emitted from the light source as the light emitted from the light source proceeds toward the optical information storage medium in the optical path forming member, and a second optical path of the light emitted from the light source, after reflection by the optical information storage medium, in the optical path forming member. In this case, the main photodetector may be arranged on the optical bench, and the optical path separating member may be located between the focusing member and the optical path forming member. The optical path separating member may be a diffraction optical element or a combination of a polarization diffraction element and a quarter-wave plate, and may be integrated with the focusing member in a single body.

According to another aspect of the invention, there is provided an optical recording and/or reproducing apparatus comprising an optical pickup, a rotating unit that rotates an optical information storage medium, a driving unit that drives the optical pickup and the rotating unit, and a control unit that controls the driving unit, wherein the optical pickup comprises: a light source; an optical bench on which the light source is mounted; a focusing member, comprising an objective lens, focusing light emitted from the light source to form a light spot on an optical information storage medium; and an optical path forming member comprising a transparent block comprising: a light entrance/exit surface on which the optical bench and the focusing member are arranged; a first reflection surface; and a second reflection surface opposing the first reflection surface, wherein the optical path forming member directs the light emitted from the light source toward the objective lens by reflecting the light emitted from the light source on the first and second reflection surfaces.

BRIEF DESCRIPTION OF THE DRAWINGS

The above and other objects, features and advantages of the invention will become more apparent by describing in detail exemplary embodiments thereof with reference to the attached drawings in which.

DETAILED DESCRIPTION OF THE INVENTION

Exemplary embodiments of the invention will now be described below by reference to the attached Figures. The described exemplary embodiments are intended to assist the understanding of the invention, and are not intended to limit the scope of the invention in any way.

Figure 1:
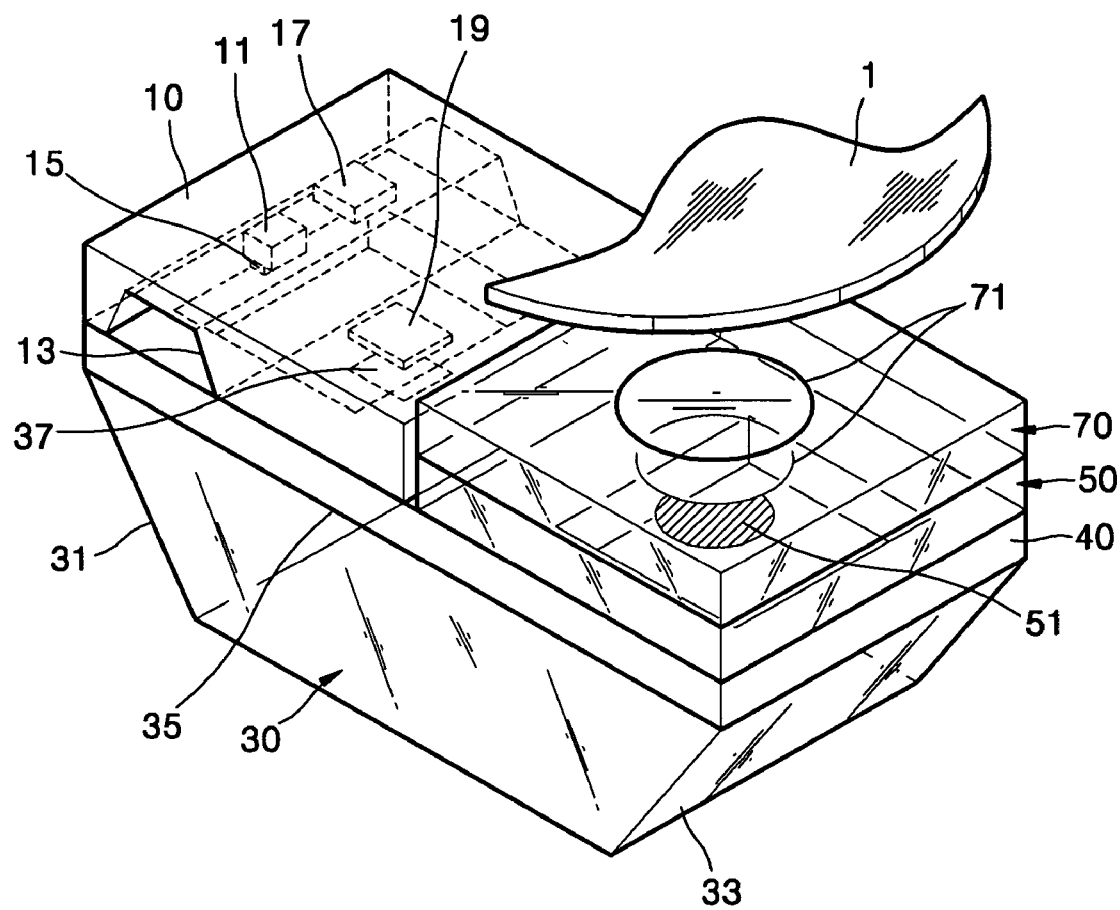
FIG. 1 is a schematic perspective view illustrating a structure of an optical pickup according to an embodiment of the invention.
Figure 2:
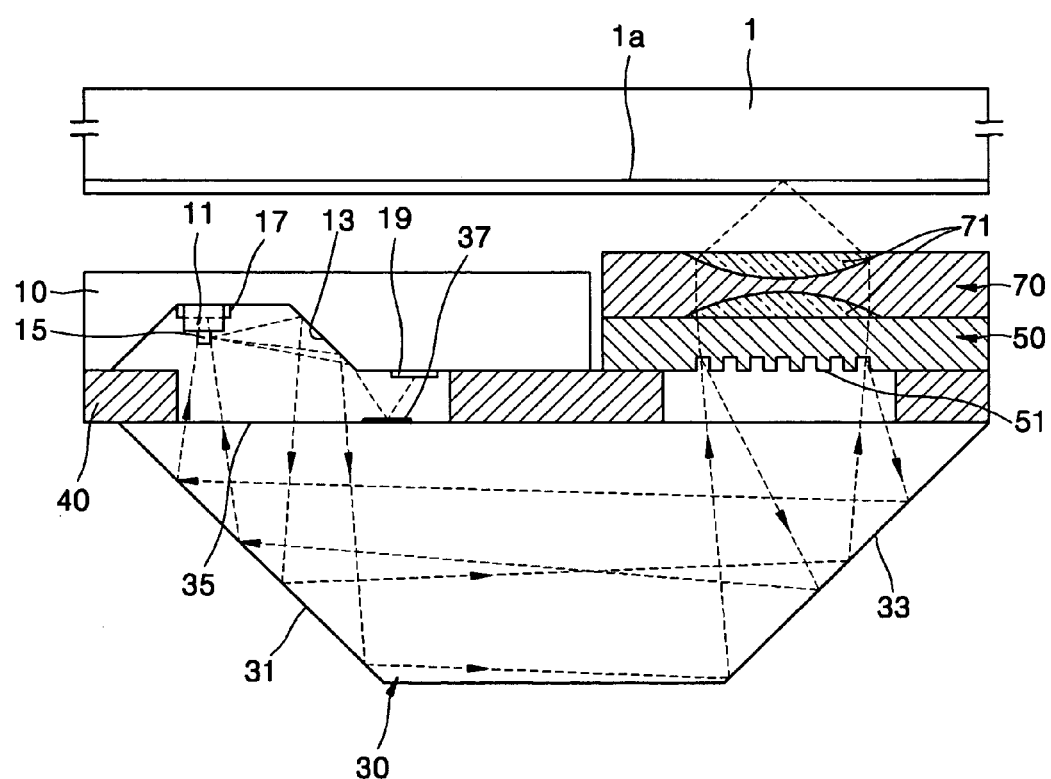
FIG. 2 illustrates optical paths in the optical pickup of FIG. 1.

Referring to FIG. 1, which is a perspective view illustrating a structure of an optical pickup according to a first embodiment of the invention, and FIG. 2, which illustrates optical paths in the optical pickup of FIG. 1, an optical pickup according to a first embodiment of the invention includes a light source 15, an optical bench 10 on which the light source 15 is mounted, a focusing member 70 having an objective lens 71 focusing a light spot onto an optical information storage medium 1, i.e., an optical disc, and an optical path forming member 30 directing light emitted from the light source 15 toward the objective lens 71 by a reflection process.

The optical pickup according to the first embodiment of the invention may further include a main photodetector 17 receiving light reflected by the optical information storage medium 1 to detect a reproducing signal and/or an error signal, and an optical path separating member 50 separating an optical path of light directing toward the optical information storage medium 1 and an optical path of light reflected by the optical information storage medium 1. The main photodetector 17 may be included in the optical bench 10. The optical path separating member 50 may be integrated with the focusing member 70.

The light source 15 may be a semiconductor laser emitting light of a predetermined wavelength. The light source 15 may be a semiconductor laser emitting light having a blue wavelength, for example, 405 nm. In this case, the optical pickup according to the invention can record information on and/or reproduce information from a blue-ray disc (BD) or advanced optical disc (AOD). Alternatively, the light source 15 may be a semiconductor laser emitting light having a red wavelength, for example, 650 nm. In this case, the optical pickup according to the invention can record information on and/or reproduce information from a digital versatile disc (DVD).

Furthermore, the light source 15 may be configured to emit light in another wavelength range. The light source 15 may be configured to emit light of different wavelengths such that the optical pickup according to the invention is compatible with a plurality of optical information storage media having different formats.

The wavelength of light emitted from the light source 15 may vary depending on a target optical information storage medium that uses the optical pickup according to the invention. Therefore, the optical pickup according to the invention can record data on, or reproduce data from, various kinds of optical information storage media, for example, a CD-family optical disc, a DVD-family optical disc, a BD, and/or an AOD.

The light source 15 may be an edge emitting type semiconductor laser emitting a laser beam in a lateral direction of semiconductor material layers. Considering a light emitting structure of this type semiconductor laser, the optical bench 10 may include a mount 11 on which the light source 15 is mounted and a slanting mirror surface 13 reflecting the light emitted from the light source 15 toward the optical path forming member 30.

Light receiving and emitting devices, i.e., the light source 15 and the main photodetector 17, are arranged on the optical bench 10, for example, a silicon optical bench (SiOB). To arrange the light source 15 and the main photodetector 17, a receiving groove with slanting sidewalls are formed in the optical bench 10, and the slanting mirror surface 13 is formed by coating the slanting sidewalls to be reflective.

A semiconductor laser used as the light source 15 may be a vertical cavity surface emitting laser (VCSEL) emitting laser light in a direction in which semiconductor material layers are stacked. In this case, the optical bench 10 may have a structure not including the mount 11 and the slanting mirror surface 13.

The objective lens 71 in the focusing member 70 focuses light incident from the light source 15 to form a light spot on an information storage surface 1a of the optical information storage medium 1. The objective lens 71 may have a structure including one or a plurality of refraction lenses, diffraction lenses, or gradient index (GRIN) lenses or may be a hybrid lens in which at least two kinds of these lenses are combined. FIGS. 1 and 2 illustrate an example of the objective lens 71 implemented with two refraction lenses.

When using a hybrid lens in which at least two kinds of lenses are combined, the two lenses can compensate for each other, thereby relieving aberration such as chromatic aberration, spherical aberration, etc. For example, the diffraction lens has a greater diffraction angle with respect to a longer wavelength of light, and the refraction lens has a smaller refraction angle with respect to a longer wavelength of light. Therefore, by combining the diffraction lens and the refraction lens, an occurrence of chromatic aberration due to a variation in the wavelength of light emitted from the light source 15 can be suppressed.

The focusing member 70 including the objective lens 71 may be manufactured on a wafer scale in array form by semiconductor manufacturing processes. The focusing member 70 for use in an optical pickup may be obtained by dicing the array of focusing members 70 manufactured in a wafer.

The optical bench 10 and the focusing member 70 are arranged on a light entrance/exit surface 35 of the optical path forming member 30. The optical path forming member 30 reflects light emitted from the light source 15 and entering the transparent block thereof through the light entrance/exit surface 35 toward the objective lens 71.

The optical path forming member 30 may be a transparent block having first and second reflection mirror surfaces 31 and 33 on both external sides to form optical paths.

As shown in FIGS. 1 and 2, the two external sides, i.e., the first and second reflection mirror surfaces 31 and 33, of the optical path forming member 30 may be inclined. Alternatively, the first reflection mirror surface 31 may be formed perpendicular to the base while only the second reflection mirror surface 33 may be inclined.

In the optical path forming member 30, the first and second reflection mirror surfaces 31 and 33 may be formed by coating the external sides of the transparent block to be reflective.

The optical path forming member 30 may be formed such that the first and second reflection mirror surfaces 31 and 33 can totally internally reflect light incident on the transparent block. In this case, it is unnecessary to coat the first and second reflection mirror surfaces 31 and 33 to be reflective.

The optical path forming member 30 may be formed such that one of the first and second reflection mirror surfaces 31 and 33 can totally internally reflect incident light while the other reflection mirror surface may be formed by coating to be reflective.

When the transparent block is made of a material having, for example, a refractive index of 1.5, an angle of incidence satisfying total internal reflection conditions is about 42 degrees or greater.

For example, it is assumed that the light source 15 is mounted on the optical bench 10 to emit light in a horizontal direction, and the slanting mirror surface 13 of the optical bench 10 is inclined at 45 degrees such that the path of the light emitted from the light source 15 is changed by 90 degrees. It is also assumed that light reflected by the slanting mirror surface 13 is incident on the light entrance/exit surface 35 of the optical path forming member 30 perpendicular to the same and the optical path forming member 30 is formed such that the first and second reflection mirror surfaces 31 and 33 are inclined at 45 degrees with respect to the horizontal direction in opposite directions. With these assumptions, light is incident on the first reflection mirror surface 31 at 45 degrees so that the light is totally internally reflected by the first reflection mirror surface 31. Also, the light totally internally reflected by the first reflection mirror surface 21 is incident on the second reflection mirror surface 33 at 45 degrees so that the light is totally internally reflected by the second reflection mirror surface 33.

As described above, the optical path forming member 30 can be formed such that the first and/or second reflection mirror surfaces 31 and 33 can totally internally reflect the incident light. In this case, advantageously an additional reflection-coating process on the total, internal reflection surfaces is unnecessary.

The angle of inclination of the slanting mirror surface 13 of the optical bench 10 may vary. In the optical path forming member 30 described above, the angles of slanting of the first and second reflection mirror surfaces 31 and 33 may vary depending on the angle of incidence of light on the optical path forming member 30 from the light source 15.

The optical path separating member 50 separates an optical path of light directing toward the optical information storage medium 1 and an optical path of light reflected by the optical information storage medium 1. The optical path separating member 50 may be integrated with the focusing member 70 in a single body.

In the optical pickup according to the invention, the optical path separating member 50, for example, directly transmits light proceeding toward the optical information storage medium 1, and diffracts and transmits the light reflected by the optical information storage medium 1, thereby separating the optical path of the light proceeding toward the optical information storage medium 1 and the optical path of the light reflected by the optical information storage medium 1. FIGS. 1 and 2 illustrate an example of the optical path separating member 50 implemented with a diffraction optical element, for example, a hologram optical element (HOE) or a diffractive optical element (DOE).

Light reflected by the optical information storage medium 1 and diffracted while passing through the optical path separating member 50 proceeds at a diffraction angle from the light proceeding toward the optical information storage medium 1 and is received by a main photodetector 17 arranged at a location separated from the light source 15.

The optical pickup according to the invention may further include a monitoring photodetector 19, which monitors the light emitted from the light source 15, and a reflection mirror 37, which reflects a portion of the light emitted from the light source 15 toward the monitoring photodetector 19.

As shown in FIGS. 1 and 2, the monitoring photodetector 19 may be formed on the optical bench 10, and the reflection mirror 37 may be formed on the optical path forming member 30. The reflection mirror 37 is formed on a region of the light entrance/exit surface 35 of the optical path forming member 30.

The reflection mirror 37 may be disposed such that light which is not used for optical recording and/or reproduction can be incident on the reflection mirror 37 directly or after being reflected by the slanting mirror surface 13 for monitoring control.

As described below, the intensity of light emitted from a semiconductor laser used as the light source 15 substantially has a Gaussian distribution. In practice, only central light in a predetermined center region of the light emitted from the semiconductor laser is used for optical recording and/or reproduction, and peripheral light is not used for optical recording and/or reproduction and ignored. Monitoring control may be performed using this ignored light.

In FIGS. 1 and 2, reference numeral 40 denotes a spacer located between the optical bench 10 and the optical path forming member 3 and formed to open at least optical path region. The optical pickup according to the invention may be configured in a structure without the space 40 by changing the shapes of the optical bench 10, the optical path forming member 30, and/or the optical path separating member 50.

Regarding the optical path of the optical pickup according to the first embodiment of the invention described above, the light emitted from the light source 15 formed on the optical bench 10 is reflected by the slanting mirror surface 13 and incident on the optical path forming member 30. The incident light is sequentially reflected by the first and second reflection mirror surfaces 31 and 33, passes through the optical path separating member 50, and is then focused by the focusing member 70 so that a light spot is formed on an information storage surface 1a of the optical information storage medium 1. Light reflected by the information storage surface 1a passes through the focusing member 70, and the direction in which the light proceeds is changed by the optical path separating member 50. The light is sequentially reflected by the second and first reflection mirror surfaces 33 and 31 and received by the main photodetector 17 formed on the optical bench 10. An information reproduction signal and/or an error signal are obtained from a signal detected by the main photodetector 17.

A portion of the light emitted from the light source 15 is reflected by the reflection mirror 37 and received by the monitoring photodetector 19. A signal received by the monitoring photodetector 19 is used for controlling the power of light emitted from the light source 15.

Figure 3:
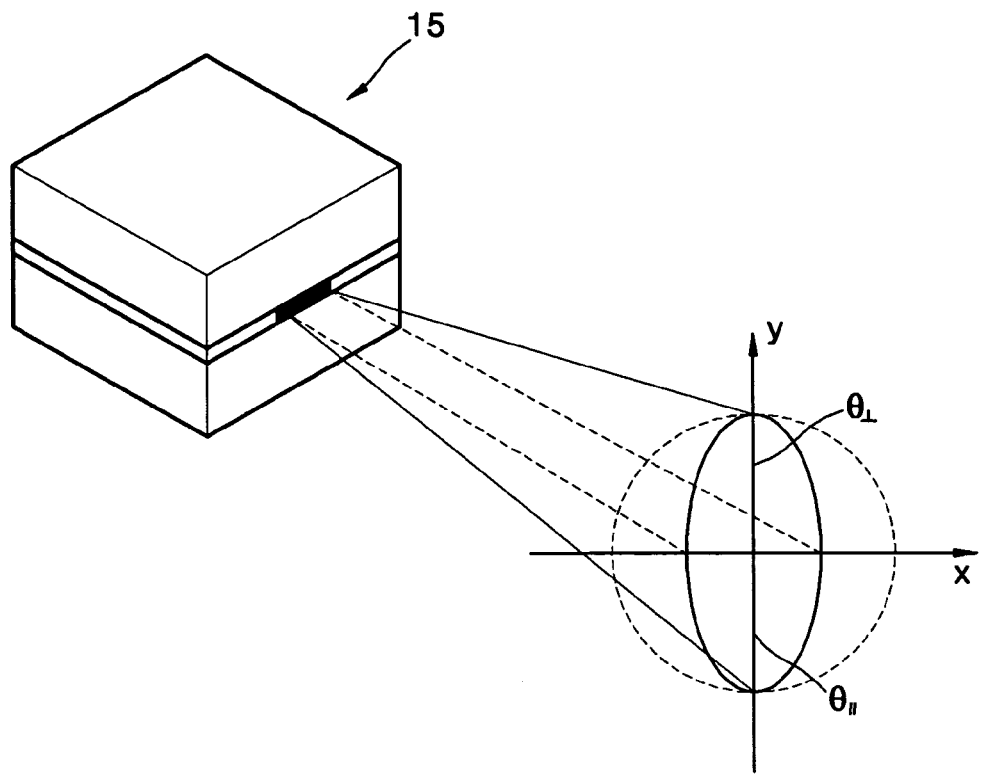
FIG. 3 illustrates a shape of a laser beam emitted from a semiconductor laser.
Figure 4:
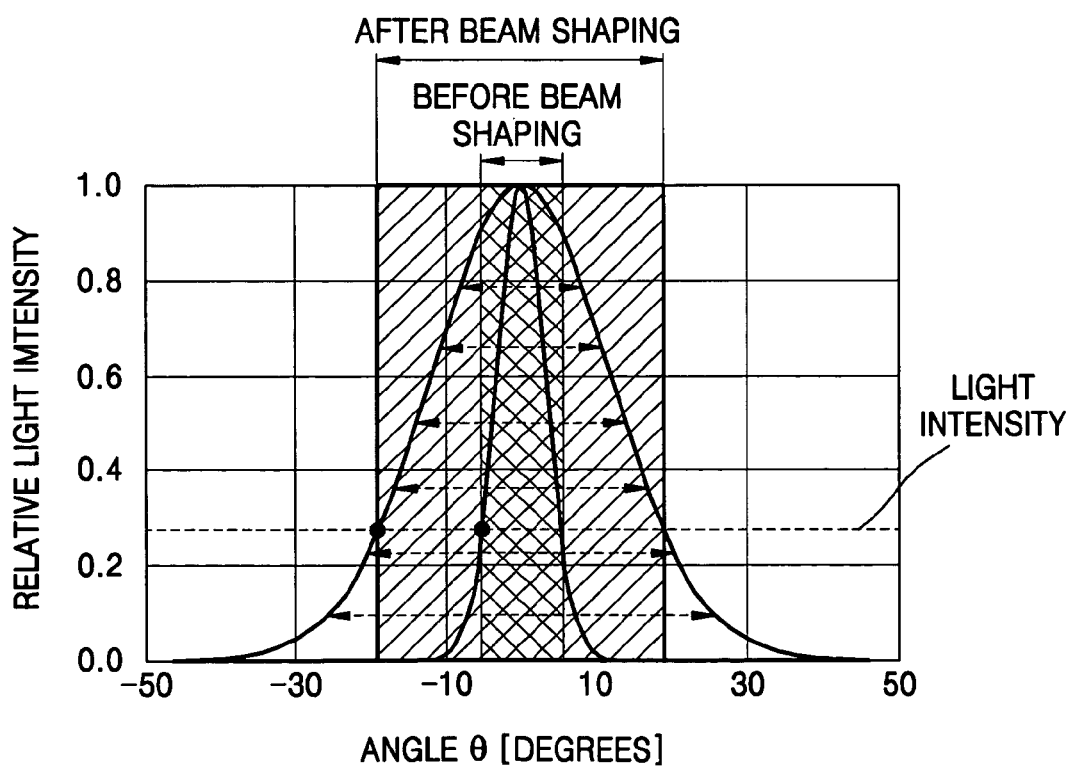
FIG. 4 is a graph of distributions of intensity of the laser beam emitted from the semiconductor laser of FIG. 3 in horizontal and vertical directions.

When an edge emission type semiconductor laser is used as the light source 15, an elliptical laser beam having an angle of horizontal divergence ($\theta_\parallel$) and an angle of vertical divergence ($\theta_\perp$), which differ from one another, is emitted from the semiconductor laser, as illustrated in FIG. 3. Referring to FIGS. 3 and 4, when the direction in which semiconductor material layers constituting the semiconductor laser are stacked is defined to be a vertical direction, the angle of horizontal divergence ($\theta_\parallel$) is smaller than the angle of vertical divergence ($\theta_\perp$), so that a horizontal beam diameter is smaller than a vertical beam diameter.

Referring to FIG. 4, a general optical system is configured such that only a beam region having a light intensity greater than or equal to a desired minimum light intensity can be used as effective light.

Therefore, to increase the intensity of effective light in an optical system, there is a need to shape the laser beam such that the horizontal beam diameter is equal to the vertical beam diameter.

When beam shaping is not performed, the effective aperture of an optical system fits to the horizontal beam diameter, which is smaller than the vertical beam diameter, so that a considerable portion of the larger, vertical beam diameter is blocked, and accordingly the intensity of effective light and optical efficiency are reduced.

However, after beam shaping is performed such that the horizontal beam diameter is to be the same as the vertical beam diameter, most of the light can be used as effective light, thereby raising optical efficiency. Although FIG. 4 illustrates an example of shaping a beam such that the smaller horizontal beam diameter is the same as the larger vertical beam diameter, a larger diameter beam can be shaped into a smaller diameter beam.

Therefore, the optical pickup according to the invention may further include a beam shaping element shaping the light emitted from the light source 15, as described in the following embodiments. In the following embodiments, identical elements that have substantially the same or similar functions as in the previous embodiment are designated by identical reference numerals, and repetitive descriptions thereon are omitted.

The beam shaping element may include a first lens element formed either in a region of the optical path forming member 30 on which the light emitted from the light source 15 is incident or on the first reflection mirror surface of the optical path forming member 30, and a second lens element formed either in a region of the optical path forming member 30 through which the light emitted from the light source 15 exits or on the second reflective mirror surface 33 of the optical path forming member 30.

Figure 5:
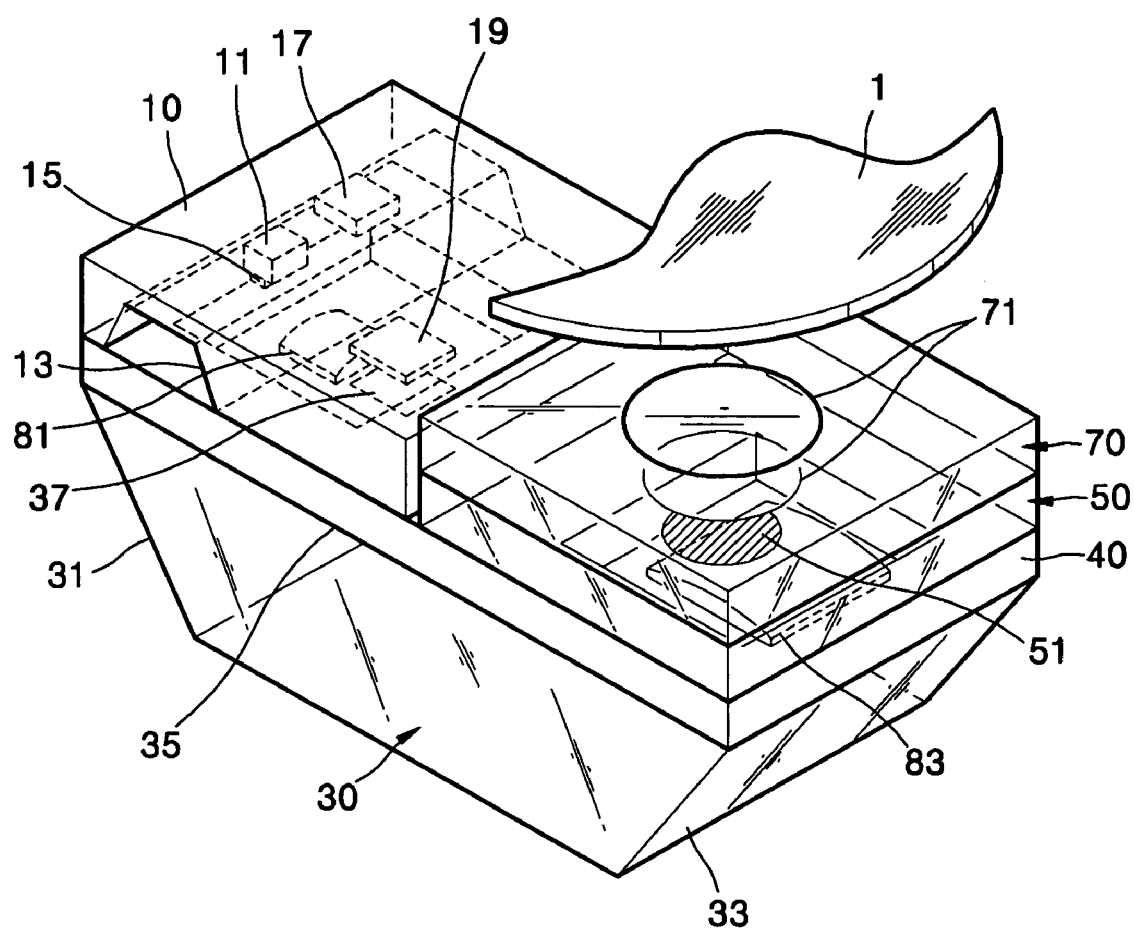
FIG. 5 is a perspective view illustrating a structure of an optical pickup according to another embodiment of the invention.
Figure 6:
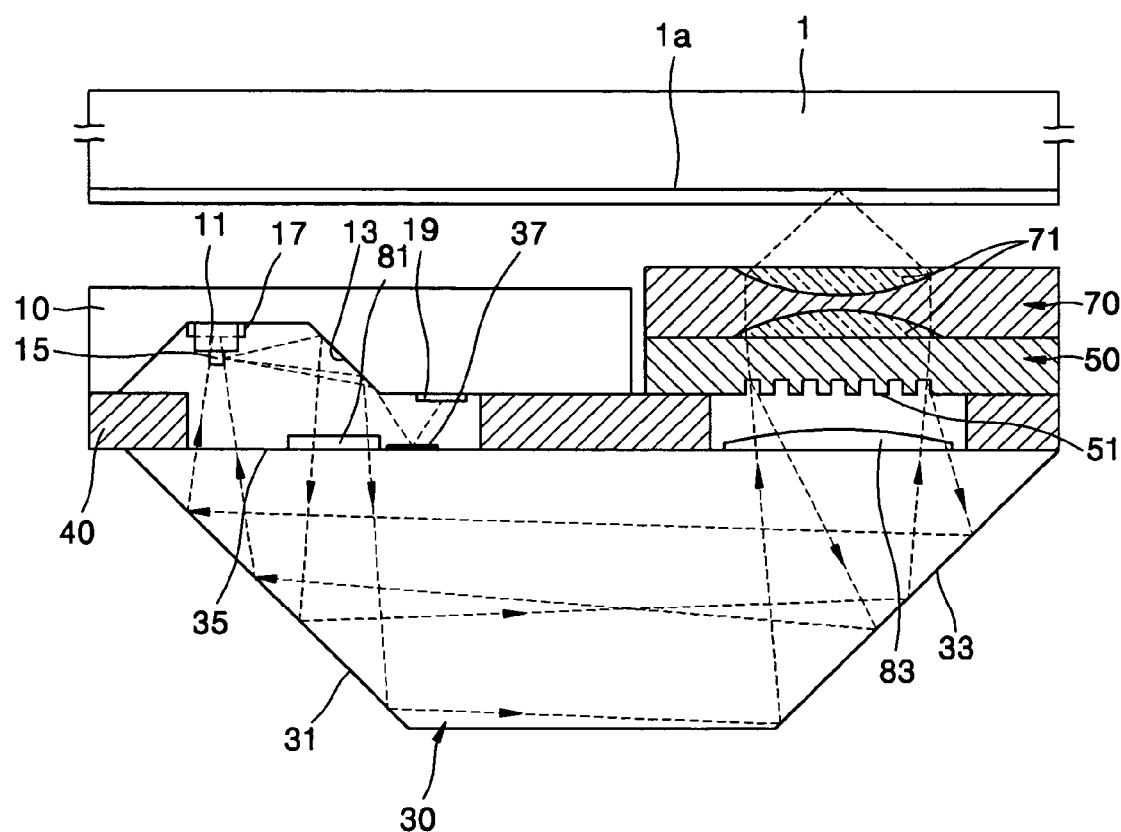
FIG. 6 illustrates optical paths in the optical pickup of FIG. 5.

FIG. 5 is a schematic perspective view illustrating a structure of an optical pickup according to a second embodiment of the invention. FIG. 6 illustrates optical paths in the optical pickup of FIG. 5.

FIGS. 5 and 6 illustrate an example in which refraction type first and second cylindrical lenses 81 and 83 are used as the first and second lens elements, respectively. The first cylindrical lens 81 is arranged in a region of the optical path forming member 30 on which the light emitted from the light source 15 is incident. The second cylindrical lens 83 is arranged in a region of the optical path forming member 30 through which the light emitted from the light source 15 exits.

When the first and second cylindrical lenses 81 and 83 are arranged in optical paths as illustrated in FIGS. 5 and 6, the beam emitted from the light source 15 can be appropriately shaped, thereby raising optical efficiency.

Although in FIGS. 5 and 6 the first and second cylindrical lenses 81 and 83 are illustrated as having curvatures in directions perpendicular to each other, the first and second cylindrical lenses 81 and 83 can be modified in various ways. For example, the first and second cylindrical lenses 81 and 83 may have curvatures in the same direction wherein one of the first and second cylindrical lenses 81 and 83 has a negative curvature while the other has a positive curvature.

When the second cylindrical lens 83, i.e., the second lens element, is disposed between the optical path forming member 30 and the optical path separating member 50, as shown in FIGS. 5 and 6, light reflected by the information storage surface 1a of the optical information storage medium 1 passes through the objective lens 71, second lens element 83, and the optical path separating member 50, so that a distortion may occur.

Figure 7:
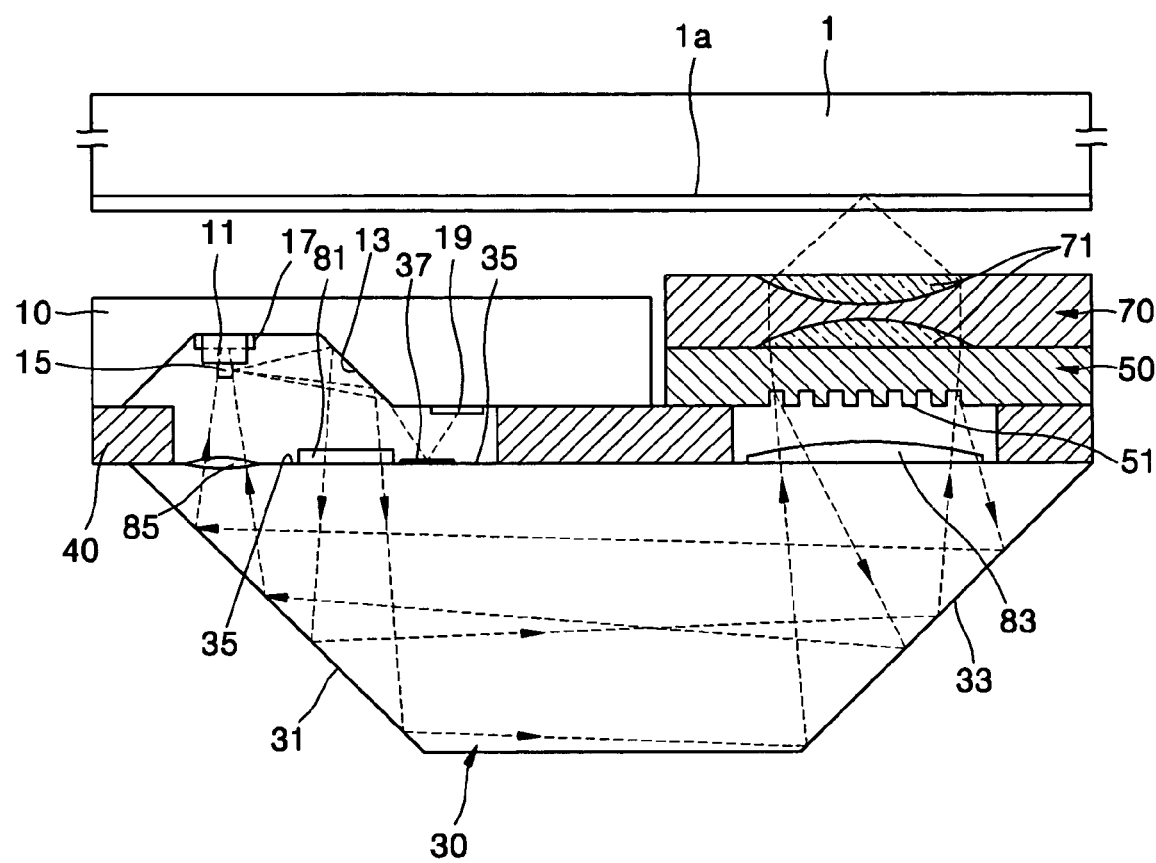
FIGS. 7, 8, 9, 10, and 11 schematically illustrate optical pickups according to embodiments of the invention.

Thus, to correct such a distortion, the optical pickup according to the invention may further include a correcting lens element 85 in an optical path along which light passes through the objective lens 71, second lens element 83, and the optical path separating member 50. Although in FIG. 7 and the following embodiments the correcting lens element 85 is exemplarily implemented with a refraction lens, the correcting lens element 85 may be implemented with other lens types, such as a diffraction lens.

Figure 8:
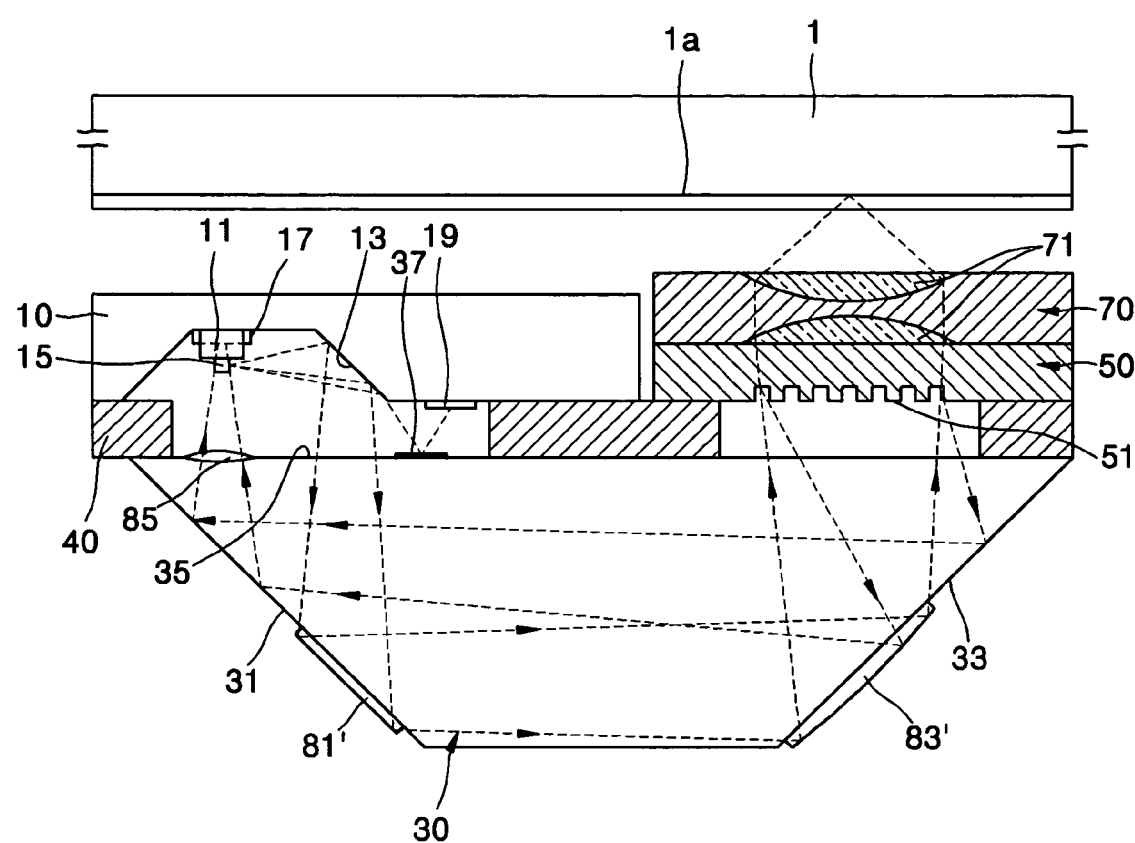

As illustrated in FIG. 8, instead of the first and second cylindrical lenses 81 and 83, a first cylindrical reflection mirror 81' may be disposed on the first reflection mirror surface 31 of the optical path forming member 30 as the first lens element, and a second cylindrical reflection mirror 83' may be disposed on the second reflection mirror surface 33 of the optical path forming member 30 as the second lens element.

The first and second cylindrical reflection mirrors 81' and 83' are manufactured such that they can function in a manner similar to the first and second cylindrical lenses 81 and 83 described above, respectively.

When the first and second reflection mirror surfaces 31 and 33 are formed by reflection-coating, the reflection-coating is performed after the first and second cylindrical reflection mirrors 81' and 83' are formed on an external surface of the transparent block.

FIGS. 5 through 8 illustrate examples in which cylindrical lenses or cylindrical reflection mirrors, which have the same functions as the cylindrical lenses, are used as the first and second lens elements. Alternatively, as illustrated in FIGS. 9 and 10, diffraction lenses, which function like cylindrical lenses, or reflection and diffraction lenses, which function like cylindrical reflection mirrors, may be used as the first and second lens elements.

Figure 9:
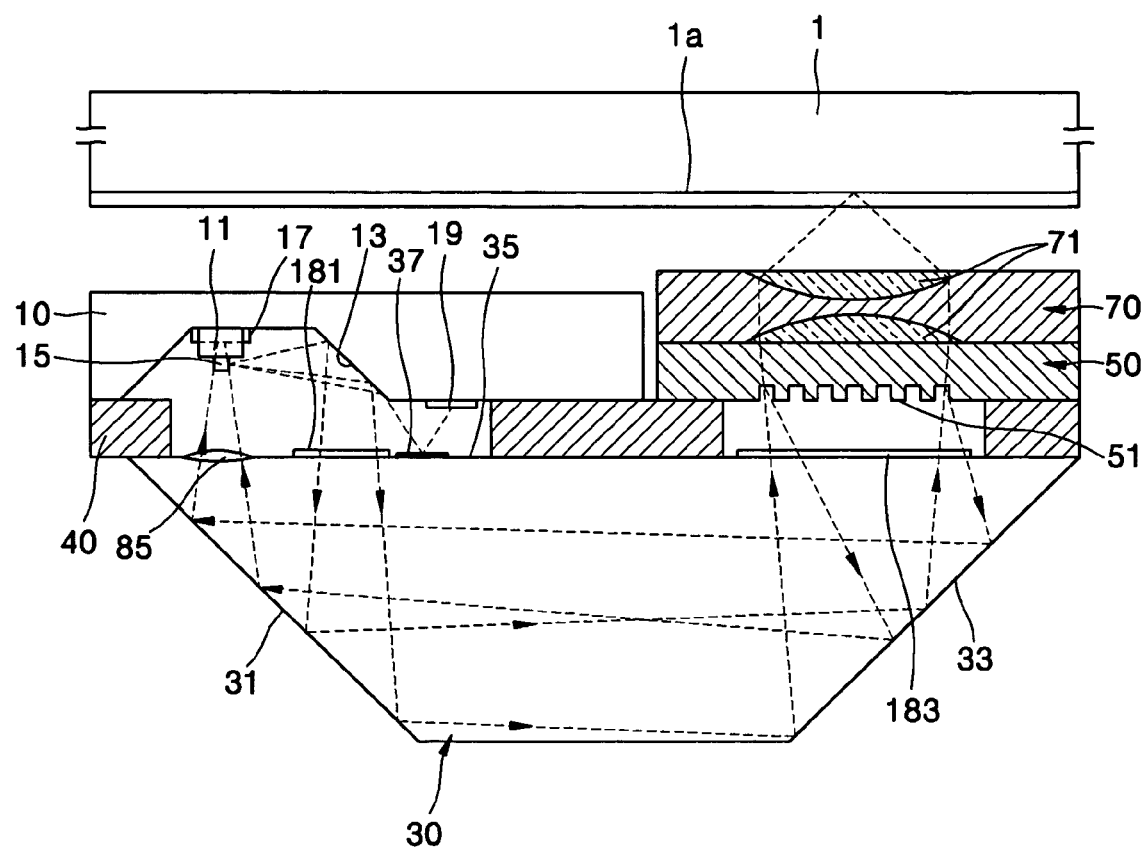

FIG. 9 illustrates a case where a first diffraction lens 181 is disposed as the first lens element on the entrance/exit surface 35 between the optical bench 10 and the optical path forming member 30, and a second diffraction lens 183 is disposed as the second lens element on the entrance/exit surface 35 between the optical path forming member 30 and the optical path separating member 50.

Figure 10:
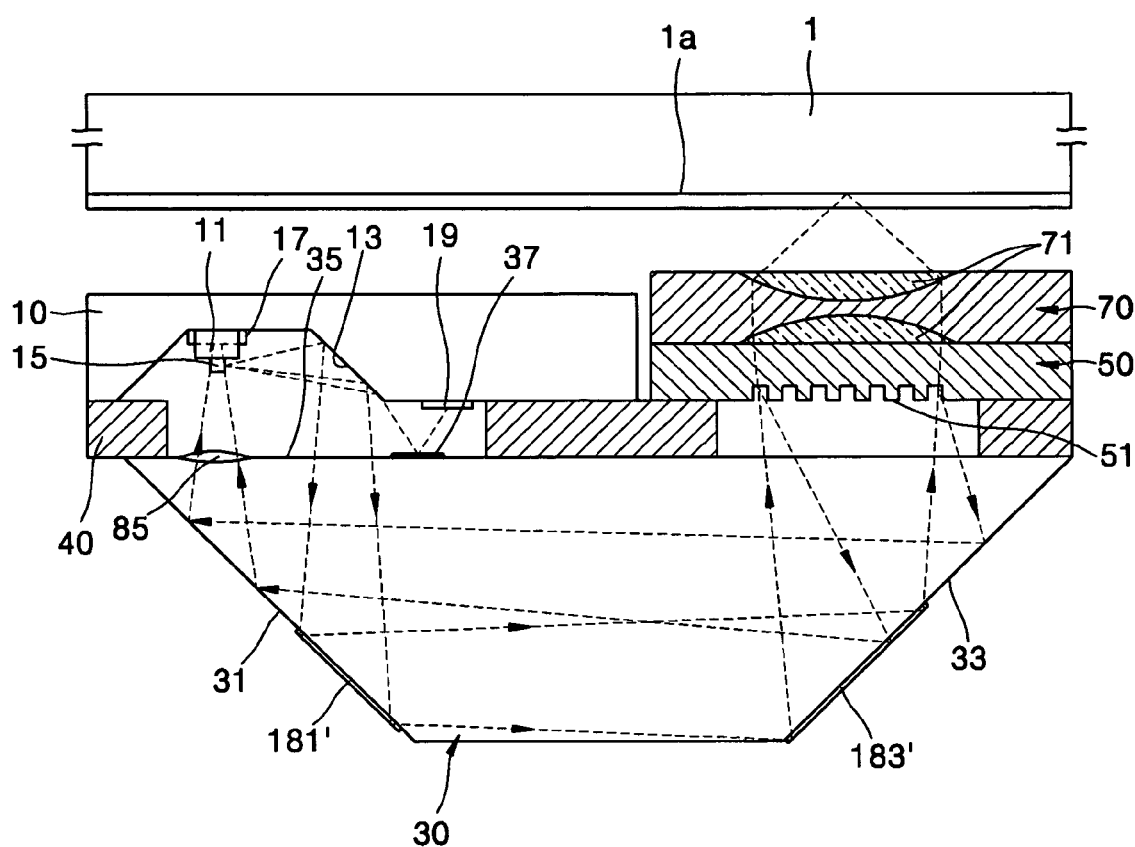

FIG. 10 illustrates a case where a first reflection and diffraction lens 181' is disposed as the first lens element on the first reflection mirror surface 31 of the optical path forming member 30, and a second reflection and diffraction lens 183' is disposed as the second lens element on the second reflection mirror surface 33 of the optical path forming member 30.

Although the same type of lenses are used for the first and second lens elements in the above-described embodiments, different types of lenses can be used for the first and second lens elements.

Figure 11:
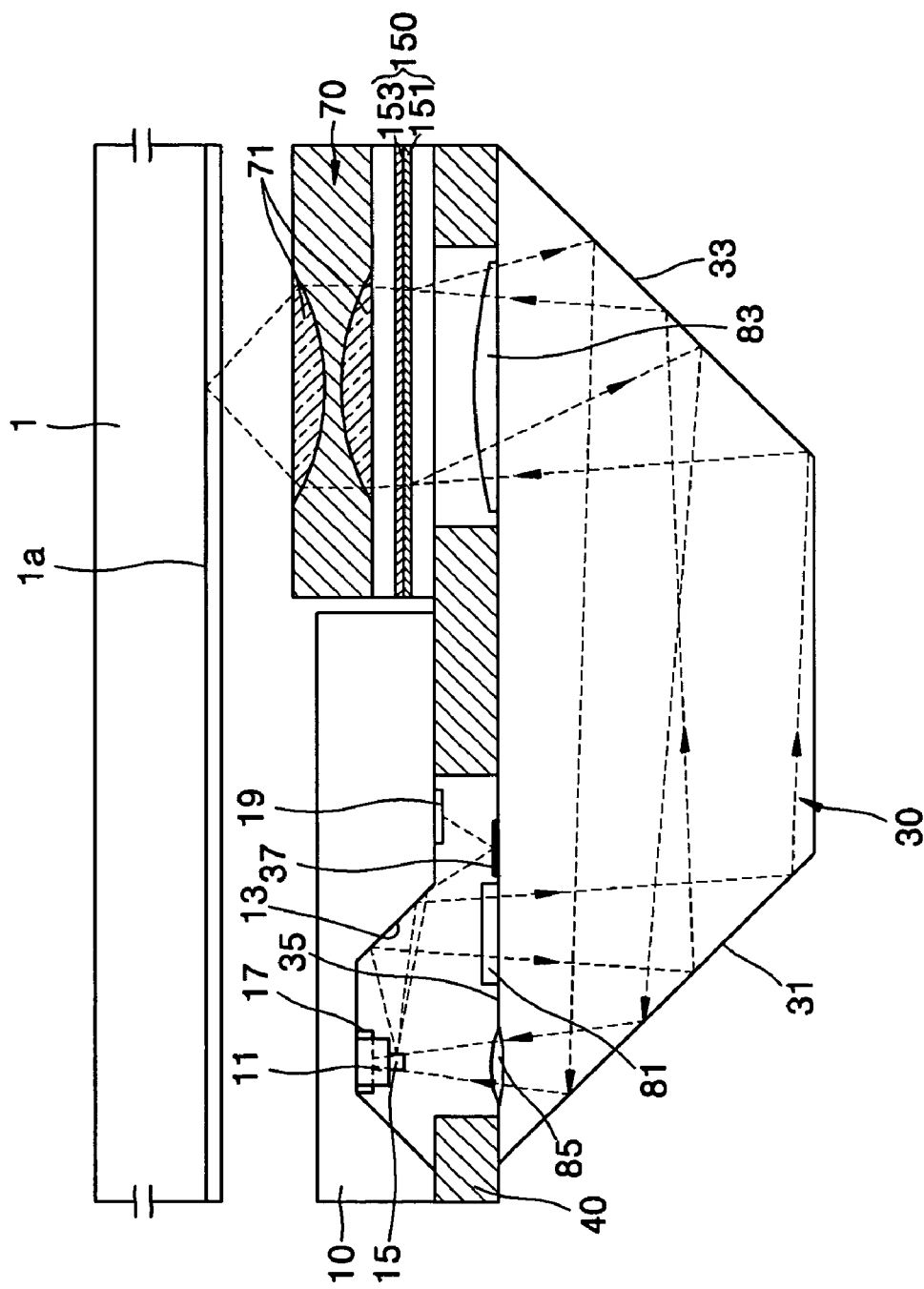

As illustrated in FIG. 11, the optical pickup according to the invention may include a polarization optical path separating member 150, instead of the optical path separating member 50 having the diffraction optical element 51.

Figure 12:
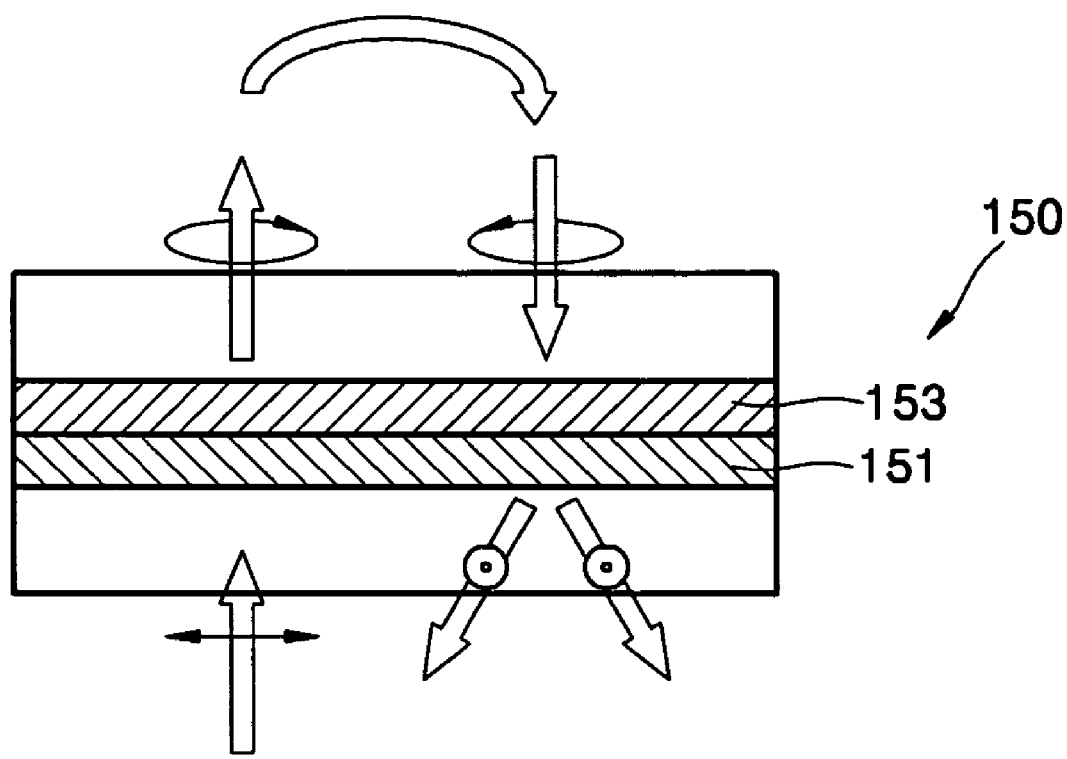
FIG. 12 is a view for explaining selective diffraction by a polarization optical path separating member of FIG. 1.

As illustrated in FIG. 12, the polarization optical path separating member 150 includes a polarization diffraction element 151, which is a polarization hologram element, selectively straightly transmitting or diffractively transmitting incident light depending on the polarization of the incident light, and a quarter-wave plate 153, which changes the polarization of the incident light.

A semiconductor laser used as the light source 15 emits laser light including a predominant linearly polarized component. Thus, substantially s-polarized or p-polarized light may be emitted from the semiconductor laser.

When the polarization diffraction element 151 is configured such that it can straightly transmit a linearly polarized light emitted from the light source 15, light which has been straightly transmitted through the polarization diffraction element 151 is changed into a first circular polarized light while passing through the quarter-wave plate 153. When the first circular polarized light is reflected by the optical information storage medium 1, it is changed into a second circular polarized light, which is orthogonal to the first circular polarized light passed through the quarter-wave plate 153 (see FIG. 12). This second circular polarized light is changed into another linearly polarized light while passing through the quarter-wave plate 153 and is diffracted by the polarization diffraction element 151.

Therefore, the optical path of the light proceeding toward the optical information storage medium 1 and the optical path of the light reflected by the optical information storage medium 1 can be separated from one another by the polarization optical path separating member 150.

FIG. 11 illustrates a case where the polarization optical path separating member 150 instead of the optical path separating member 50 is used in the optical pickup of FIG. 5. The polarization optical path separating member 150 can be used in the other embodiments described above.

When the optical pickup according to the invention includes the polarization optical path separating member 150 as in the above case, the polarization of the light proceeding toward the optical information storage medium 1 and the polarization of the light returning after being reflected by the optical information storage medium 1 are orthogonal. Thus, as illustrated in FIG. 13, a polarization diffraction lens 283 can be used as the second lens element.

The polarization diffraction lens 283 is configured such that it can function as a cylindrical lens with respect to light proceeding toward the focusing member 70 and does not function as a diffraction lens to light reflected by the optical information storage medium 1 and passing the polarization optical path separating member 150.

Figure 13:
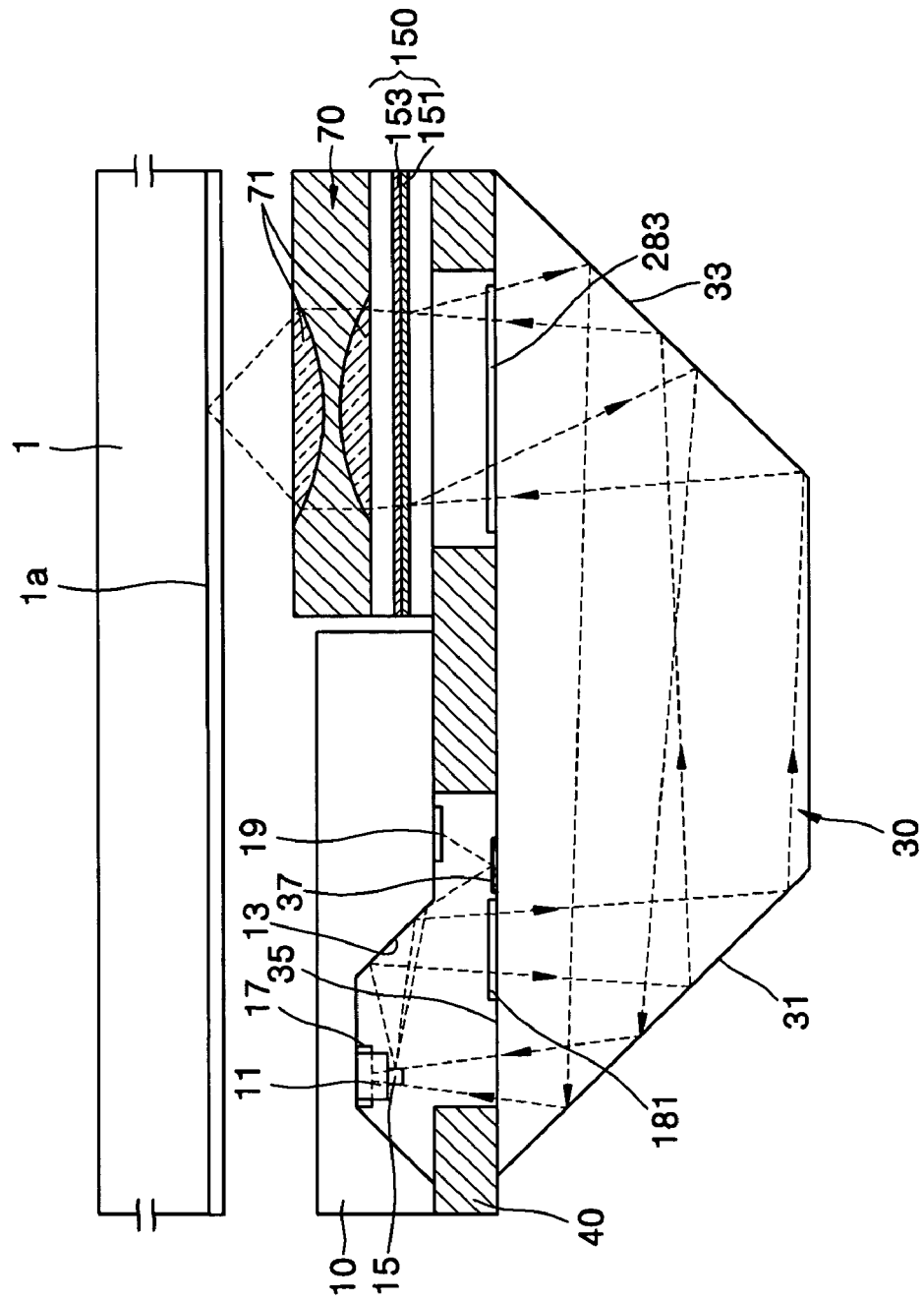
FIG. 13 is a schematic view of an optical path according to another embodiment of the invention.

The polarization diffraction lens 283 disposed on the entrance/exit surface 35 of the optical path forming member 30 in FIG. 13 is of a transmission type. The polarization diffraction lens 283 can also be a reflection type when disposed on the second reflection mirror surface 33 of the optical path forming member 30. Although the case where the first diffraction lens 181 is used as the first lens element is illustrated in FIG. 13, one of a refraction cylindrical lens, a cylindrical reflection mirror, and a reflection diffraction lens can be used instead of the first diffraction lens 181.

When the polarization diffraction lens 283 is used as the second lens element as in FIG. 13, returning light reflected by the optical information storage medium 1 straightly passes through the polarization diffraction lens 283 and no distortion occurs. Therefore, the correcting lens element 85 is not needed.

Although various embodiments of the optical pickup according to the invention have been described with reference to the appended drawings, the invention is not limited to the embodiments, the invention is to cover all modifications, equivalents and alternatives falling within the spirit and scope of the appended claims.

A process of manufacturing an optical pickup according to the invention having a beam shaping element as described above will be described.

Figure 14:
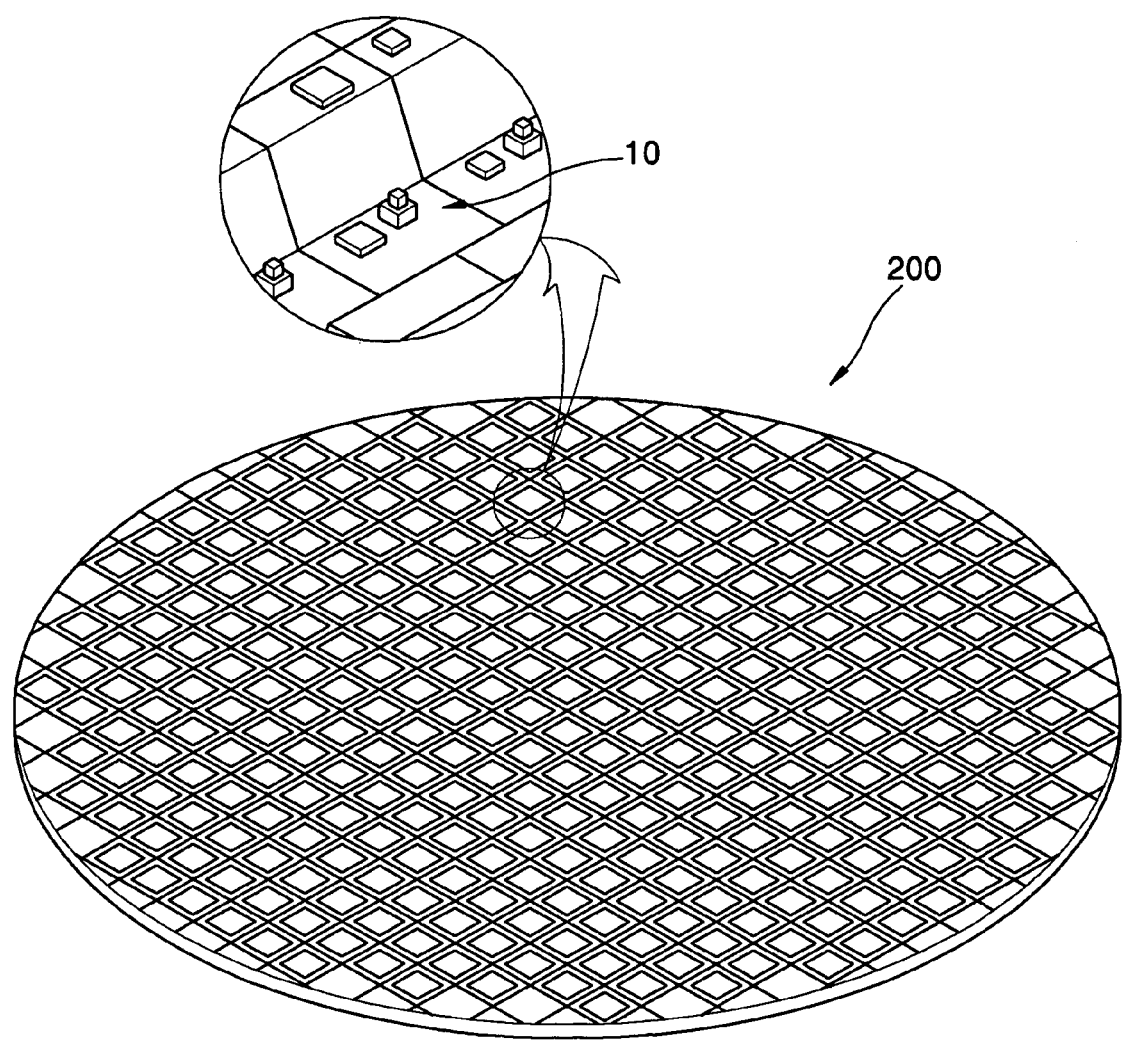
FIG. 14 illustrates an optical bench array formed in a silicon wafer.

Initially, the optical bench 10 can be manufactured as follows. Referring to FIG. 14, the optical bench 10 is manufactured by forming a receiving groove having slanting sides and the mount 11, which protrudes from the bottom of the receiving groove, in a silicon wafer 200 by, for example, an etching process, and arranging the light source 15 and the main photodetector 17 in the receiving groove. The slanting mirror surfaces 13 are formed by coating the slanting sides of the receiving groove to be reflective. The monitoring photodetector 19 is arranged on a top surface of the optical bench 10 near the receiving groove.

In a process of manufacturing optical pickups on a mass scale, an array of optical benches 10 is formed in the silicon wafer 200 and diced into individual optical benches 10 to be used for optical pickups.

The optical path forming member 30 can be manufactured by the following processes.

Figure 15A:
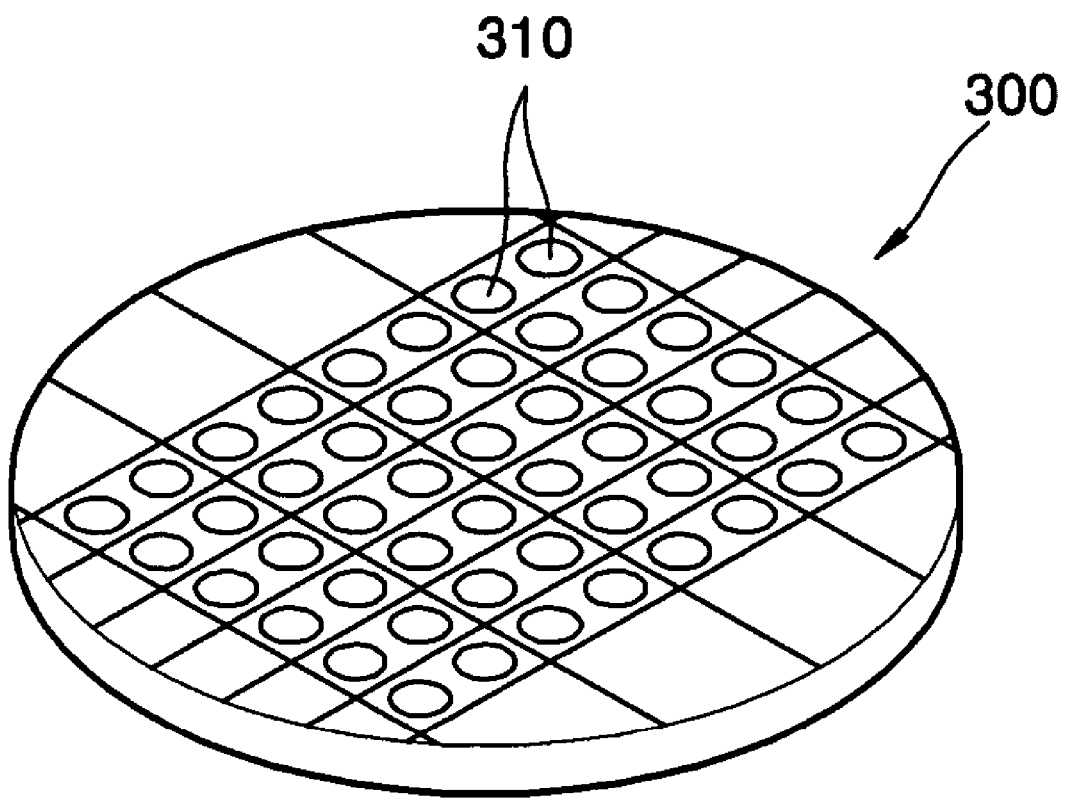
FIGS. 15 through 15C are schematic views for explaining a process of manufacturing an optical path forming member.

Referring to FIG. 15A, beam shaping elements 310, for example, lenses, are processed onto or attached to one surface of a wafer 300, which is made of a transparent material, for example, glass or a polymeric material. A reflection mirror (not shown) for monitoring is formed by coating the one surface of the transparent wafer 300.

As described above, after forming the beam shaping elements 310 on one surface of the transparent wafer 300, the mirror surface is formed on the surface of the transparent wafer 300 opposite to the beam shaping elements by a mirror surface forming process using grinding and polishing. As illustrated in FIG. 15C, a reflection film coating process using, for example, sputtering, is performed on the mirror surface to manufacture an array of optical path forming members 30 having the first and second reflection surfaces 31 and 33.

When the mirror surfaces are manufactured by a mirror surface forming process such that it has an angle of inclination satisfying total internal reflection conditions, the reflection layer coating process can be omitted.

Figure 15B:
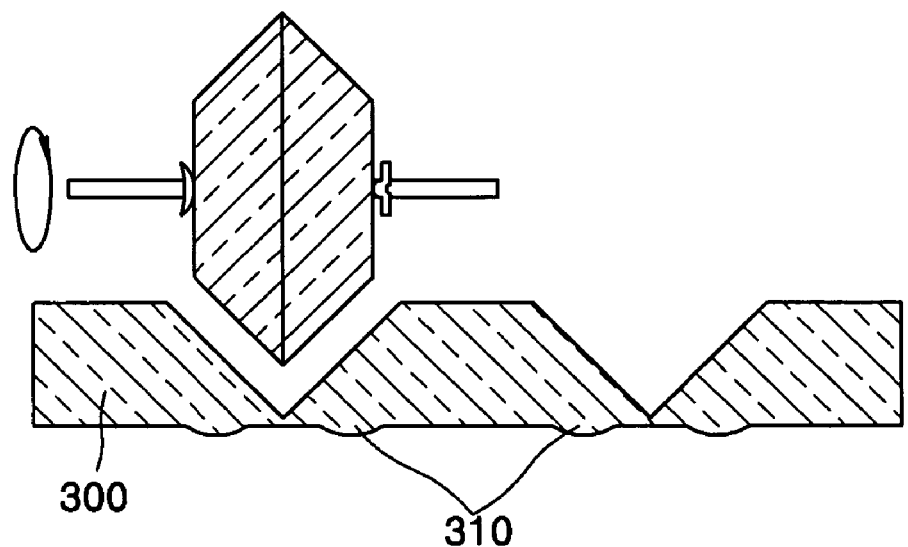
Figure 15C:
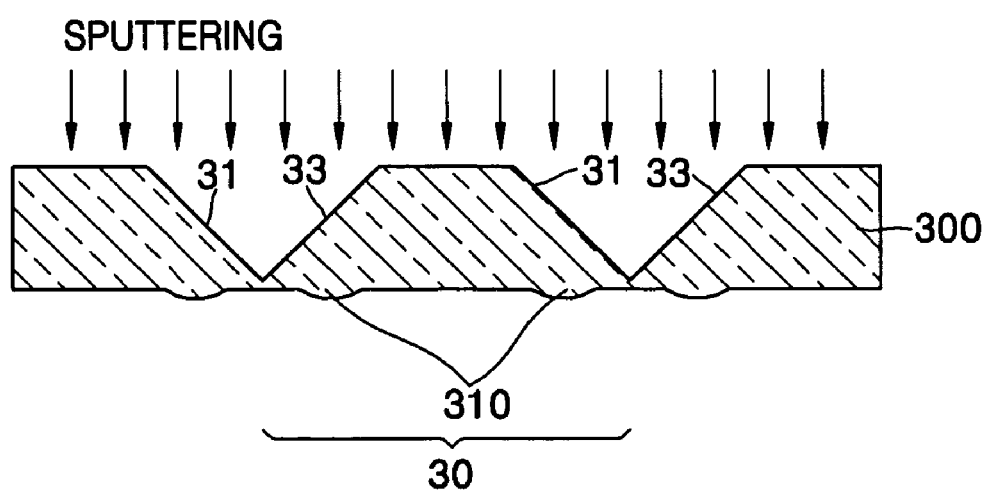

As in FIGS. 15A through 15C, the optical path forming member 30 can be manufactured from a wafer scale array. In this case, the array of optical path forming members 30 is diced into individual optical path forming members 30 for use in optical pickups.

The optical path forming member 30 manufactured as described above is an anamorphic mirror block having a pair of anamorphic lenses on one surface.

When a beam shaping element is disposed on an external slanting surface, i.e., the first and second reflection mirror surfaces 31 of the transparent block forming the optical path forming member 30, the slanting mirror surface is formed on the transparent wafer 300 by a mirror surface forming process, the beam shaping element, i.e., a lens, is attached to the slanting mirror surface, followed by a reflection film coating process. Alternatively, a transparent block integrated with a beam shaping element in a single body can be manufactured by processing the external surface of the transparent block to form the beam shaping lens thereon.

When a diffraction lens is used as the beam shaping element, the diffraction lens is formed on one surface of the transparent wafer 300 by patterning or is attached thereto, followed by a mirror surface forming process. In addition, when a reflection and diffraction lens acting as a beam shaping element is disposed on the external slanting surface, i.e., the first and second reflection mirror surfaces 31 and 33 of the transparent block forming the optical path forming member 30, the slanting mirror surface is formed on the transparent wafer 300 by a mirror surface forming process, and the beam shaping element, i.e., the reflection and diffraction lens, is attached to the slanting mirror surface.

Figure 16:
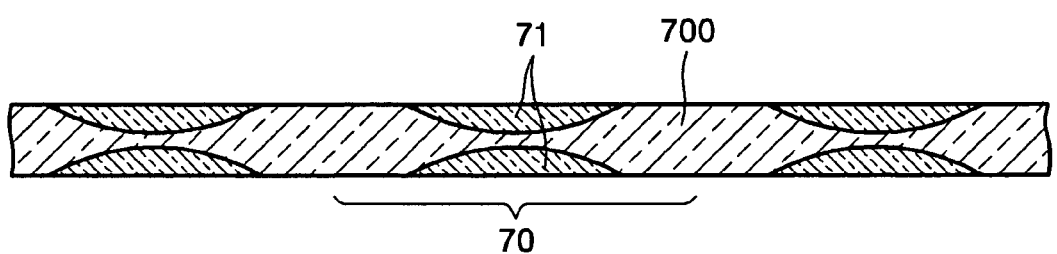
FIG. 16 illustrates a section of a wafer in which focusing members including an objective lens are formed in an array.
Figure 17:
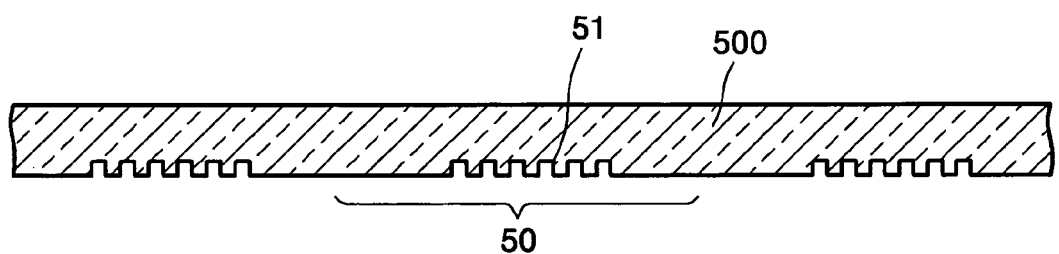
FIG. 17 illustrates a section of a wafer in which an array of diffraction optical elements used as an optical path separating member is formed.
Figure 18:
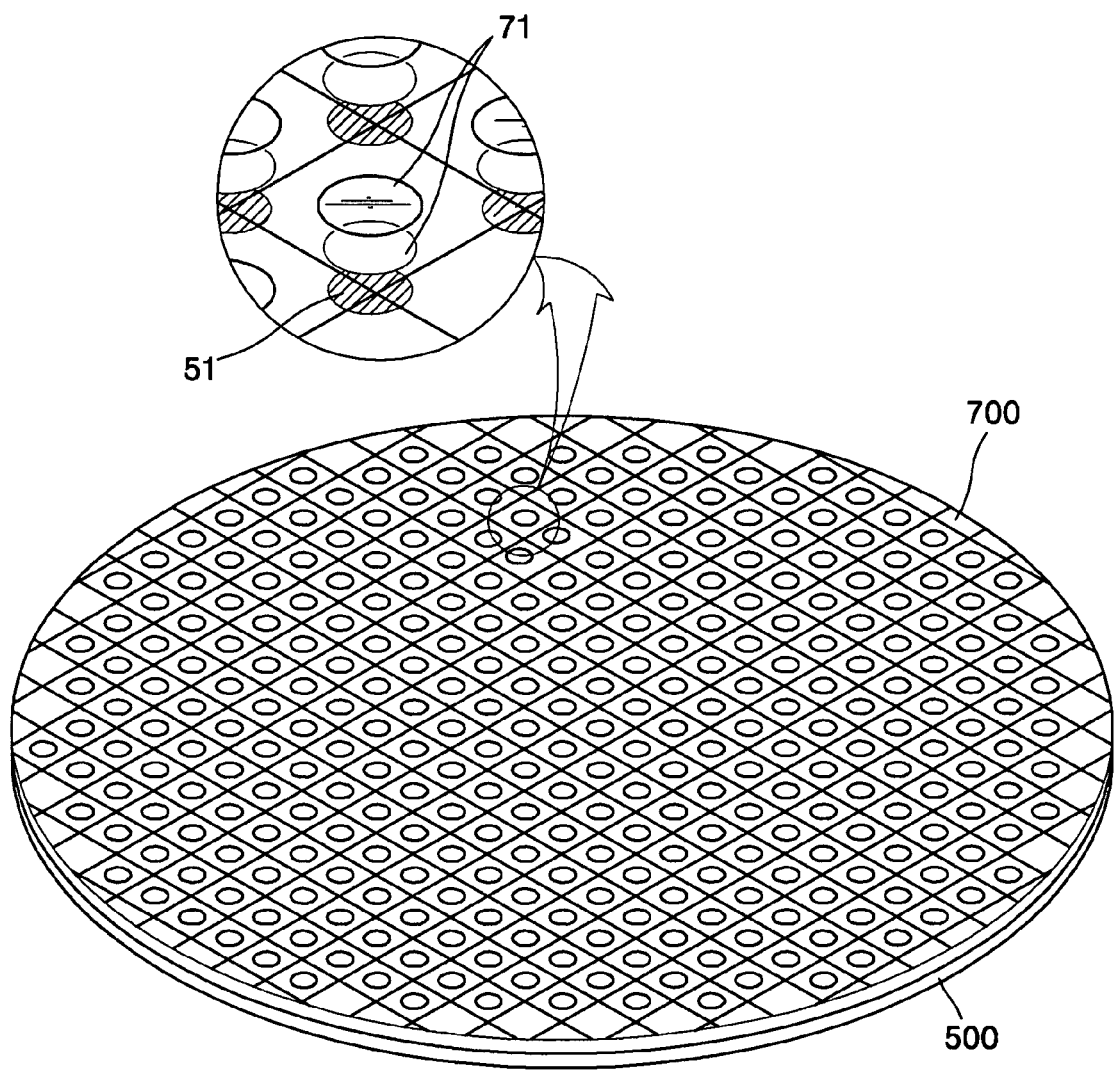
FIG. 18 illustrates a state in which a wafer including an array of focusing members and a wafer including an array of optical path separating members are bound together.

FIG. 16 is a cross-sectional view of a wafer 700 in which an array of focusing members 70, including objective lenses 71, is formed. FIG. 17 is a cross-sectional view of a wafer 500 in which an array of diffraction optical elements 51 used as the optical path separating member 50 is formed. When the polarization optical path separating member 150 is used as the optical path separating member, an array of polarization optical path separating members 150 can be formed on a wafer scale. FIG. 18 illustrates a state where the wafer 700 including the array of focusing members 70 and the wafer 500 including the array of optical path separating members 50 are bound together.

The two wafers 700 and 500 bound together are diced to obtain individual assemblies of the optical path separating member 50 and the focusing member 70 to be used in optical pickups.

Alternatively, assemblies of the focusing member 70 and the optical path separating member 50 may be formed by separately dicing the wafer 700, which includes the array of focusing members 70, into individual focusing members 70 and the wafer 500, which includes the array of optical path separating members 50, into individual optical path separating members 50, and separately binding the focusing members 70 and the optical path separating members 50.

A complete optical pickup according to the invention is obtained by mounting the optical bench 10 and the assembly of the focusing member 70 and the optical path separating member 50 in the optical path forming member 30 manufactured as described above and packaging the resultant structure.

In the above-described process of manufacturing the optical pickup according to the invention, semiconductor manufacturing processes are used directly or after modification. Thus, the optical pickup according to the invention can be integrated using semiconductor manufacturing technologies.

The above-described process of manufacturing the optical pickup according to the invention is for exemplary purposes and thus can be varied in different ways.

Figure 19:
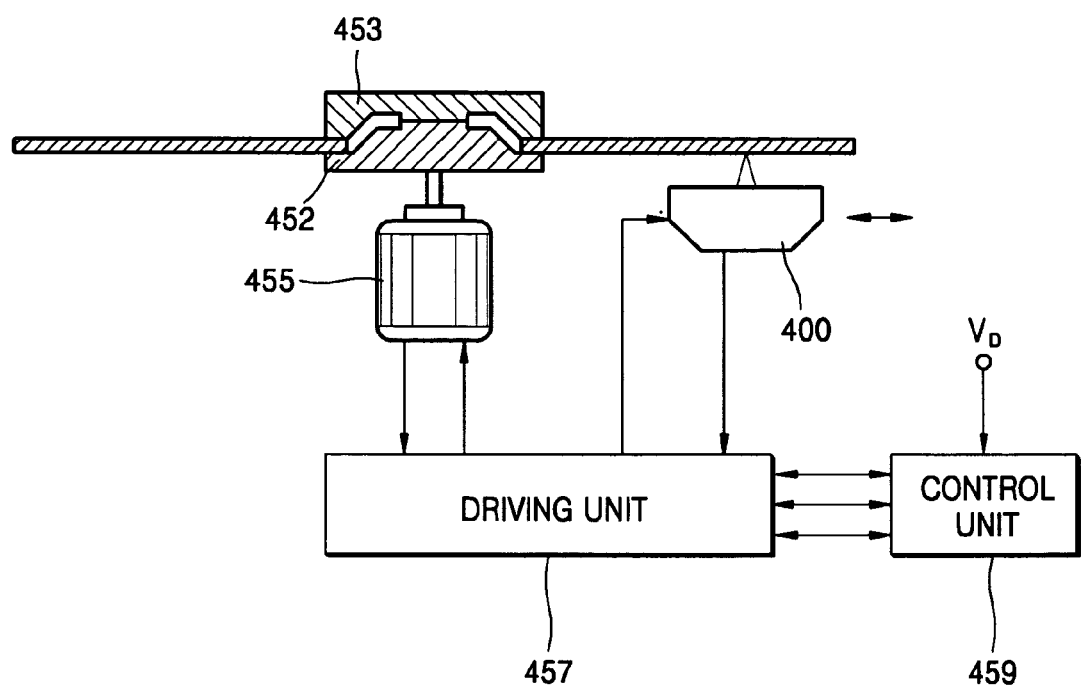
FIG. 19 is a schematic view illustrating a structure of an optical recording and/or reproducing apparatus using the optical pickup according to the invention.

FIG. 19 illustrates a structure of an optical recording and/or reproducing apparatus using the optical pickup according to the invention.

Referring to FIG. 19, the optical recording and/or reproducing apparatus includes a rotating unit including a spindle motor 455, which rotates the optical information storage medium 1 (e.g., an optical disc); an optical pickup 400, installed to be movable in a radial direction of the optical information storage medium 1, that records and/or reproduces information recorded on the optical information storage medium 1; a driving unit 457, which drives the rotating unit and the optical pickup 400; and a control unit 459, which controls the driving unit 457 to control focusing and tracking servos of the optical pickup 450. Reference numeral 452 represents a turntable, and reference numeral 453 represents a clamp chucking the optical information storage medium 1.

The optical pickup 400 may be any one of the optical pickups described above in the exemplary embodiments according to the invention.

Light reflected by the optical information storage medium 60 is detected by the main photodetector 17 mounted on the optical pickup 400 and converted into an electrical signal by photoelectrical conversion. The electrical signal is input to the control unit 459 via the driving unit 457. The driving unit 457 controls the velocity of rotation of the spindle motor 455, amplifies the input signal, and drives the optical pickup 400. The control unit 459 transmits a focus servo and tracking servo command, which has been adjusted based on the signal input from the driving unit 457, to the driving unit 457 to implement a focusing and tracking servo operation of the optical pickup.

When any one of the optical pickups according to the embodiments of the invention is used as described above, a small, slim optical recording and/or reproducing apparatus can be realized.

Therefore, the optical recording and/or reproducing apparatus using the optical pickup according to the invention can be applied to a portable terminal, for example, a PDA, a mobile phone, a digital camera, a portable disc player, a camcoder, etc.

The optical pickup according to the invention described above can satisfy the requirement for smaller, slim devices, and can be integrated using semiconductor manufacturing technologies.

The optical pickup according to the invention may further include a beam shaping element to achieve further higher optical efficiency.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. An optical pickup comprising:
a light source;
an optical bench on which the light source is mounted;
a beam shaping element shaping the light emitted from the light source;
a focusing member, comprising an objective lens, focusing light emitted from the light source to form a light spot on an optical information storage medium; and
an optical path forming member comprising a transparent block comprising: a light entrance/exit surface on which the optical bench and the focusing member are arranged; a first reflection surface; and a second reflection surface opposing the first reflection surface, wherein
the optical path forming member directs the light emitted from the light source toward the objective lens by reflecting the light emitted from the light source on the first and second reflection surfaces, and
the beam shaping element comprises:
a first lens element disposed on either a region of the optical path forming member on which the light emitted from the light source is incident, or the first reflection surface; and
a second lens element disposed on either a region of the optical path forming member through which the light emitted from the light source exits, or the second reflection surface.

2. The optical pickup of claim 1, wherein at least one of the first and second reflection surfaces is inclined with respect to the light entrance/exit surface.

3. The optical pickup of claim 2, wherein the at least one of the first and second reflection surfaces comprises a reflective coating arranged externally on the optical path forming member.

4. The optical pickup of claim 2, wherein the at least one of the first and second reflection surfaces totally internally reflects the light emitted from the light source.

5. The optical pickup of claim 2, further comprising an optical path separating member arranged between the optical path forming member and the focusing member, wherein the optical path separating member separates a first optical path of the light emitted from the light source as the light emitted from the light source proceeds toward the optical information storage medium in the optical path forming member, and a second optical path of the light emitted from the light source, after reflection by the optical information storage medium, in the optical path forming member.

6. The optical pickup of claim 1, wherein at least one of the first and second reflection surfaces comprises a reflective coating arranged externally on the optical path forming member.

7. The optical pickup of claim 1, wherein at least one of the first and second reflection surfaces totally internally reflects the light emitted from the light source.

8. The optical pickup of claim 1, further comprising an optical path separating member arranged between the optical path forming member and the focusing member, wherein the optical path separating member separates a first optical path of the light emitted from the light source as the light emitted from the light source proceeds toward the optical information storage medium in the optical path forming member, and a second optical path of the light emitted from the light source, after reflection by the optical information storage medium, in the optical path forming member.

9. The optical pickup of claim 1, wherein the light source is a semiconductor laser.

10. The optical pickup of claim 1, further comprising a third lens element that corrects distortion of light emitted from the light source after reflection by the optical information storage medium, and which has passed through the second lens element.

11. The optical pickup of claim 1, wherein the first lens element or the second lens elements is one of a refraction cylindrical lens, a diffraction lens functioning as a cylindrical lens, a cylindrical reflection mirror, and a reflection and diffraction lens functioning as a cylindrical reflection mirror.

12. An optical pickup comprising:
a light source;
an optical bench on which the light source is mounted;
a beam shaping element shaping the light emitted from the light source;
a focusing member, comprising an objective lens, focusing light emitted from the light source to form a light spot on an optical information storage medium; and
an optical path forming member comprising a transparent block comprising: a light entrance/exit surface on which the optical bench and the focusing member are arranged; a first reflection surface; and a second reflection surface opposing the first reflection surface; wherein
the optical path forming member directs the light emitted from the light source toward the objective lens by reflecting the light emitted from the light source on the first and second reflection surfaces, and
the beam shaping element comprises:
a lens element disposed on either a region of the optical path forming member on which the light emitted from the light source is incident, or the first reflection mirror surface; and
a polarization diffraction lens disposed on a region of the optical path forming member through which the light emitted from the light source exits.

13. The optical pickup of claim 12, wherein the polarization diffraction lens functions as a cylindrical lens with respect to the light emitted from the light source as it proceeds toward the focusing member.

14. The optical pickup of claim 12, wherein the lens element is one of a refraction cylindrical lens, a diffraction lens functioning as a cylindrical lens, a cylindrical reflection mirror, and a reflection and diffraction lens functioning as a cylindrical reflection mirror.

15. The optical pickup of claim 1, wherein the optical bench comprises:
a mount on which the light source is arranged; and
a slanting mirror surface that directs the light emitted from the light source toward the optical path forming member.

16. The optical pickup of claim 1, further comprising:
a third reflection mirror formed on the optical path forming member that reflects a portion of the light emitted from the light source and incident on the optical path forming member; and
a monitoring photodetector, arranged on the optical bench, that receives the portion of the light emitted from the light source and reflected by the third reflection mirror, to monitor an intensity of the light emitted from the light source.

17. The optical pickup of claim 1, further comprising:
a main photodetector that receives light emitted from the light source and reflected by the optical information storage medium to detect a reproducing signal and/or an error signal; and
an optical path separating member that separates a first optical path of the light emitted from the light source as it proceeds toward the optical information storage medium in the optical path forming member, and a second optical path of the light emitted from the light source, after reflection by the optical information storage medium, in the optical path forming member.

18. The optical pickup of claim 17, wherein the main photodetector is arranged on the optical bench, and the optical path separating member is located between the focusing member and the optical path forming member.

19. The optical pickup of claim 17, wherein the optical path separating member comprises a diffraction optical element.

20. The optical pickup of claim 17, wherein the optical path separating member comprises a polarization diffraction element and a quarter-wave plate.

21. The optical pickup of claim 17, wherein the optical path separating member is integrated with the focusing member in a single body.

22. An optical recording and/or reproducing apparatus comprising an optical pickup, a rotating unit that rotates an optical information storage medium, a driving unit that drives the optical pickup and the rotating unit, and a control unit that controls the driving unit,
wherein the optical pickup comprises:
a light source;
an optical bench on which the light source is mounted;
a beam shaping element shaping the light emitted from the light source;
a focusing member, comprising an objective lens, focusing light emitted from the light source to form a light spot on an optical information storage medium; and
an optical path forming member comprising a transparent block comprising: a light entrance/exit surface on which the optical bench and the focusing member are arranged; a first reflection surface; and a second reflection surface opposing the first reflection surface, wherein
the optical path forming member directs the light emitted from the light source toward the objective lens by reflecting the light emitted from the light source on the first and second reflection surfaces, and
the beam shaping element comprises:
a first lens element disposed on either a region of the optical path forming member on which the light emitted from the light source is incident, or the first reflection surface; and
a second lens element disposed on either a region of the optical path forming member through which the light emitted from the light source exits, or the second reflection surface.

23. The optical recording and/or reproducing apparatus of claim 22, wherein at least one of the first and second reflection surfaces is inclined with respect to the light entrance/exit surface.

24. The optical recording and/reproducing apparatus of claim 22, further comprising:
a main photodetector that receives light reflected by the optical information storage medium to detect a reproducing signal and/or an error signal; and
an optical path separating member that separates a first optical path of the light emitted from the light source as the light emitted from the light source proceeds toward the optical information storage medium in the optical path forming member, and a second optical path of the light emitted from the light source, after reflection by the optical information storage medium, in the optical path forming member.

25. The optical recording and/reproducing apparatus of claim 24, wherein the main photodetector is arranged on the optical bench, and the optical path separating member is located between the focusing member and the optical path forming member.

* * * * *